April 16, 1963 P. D. MYERS 3,085,462
DOUBLE ACTING RELEASE PIN
Filed Dec. 8, 1958

PAUL D. MYERS
INVENTOR.

BY Lyon & Lyon

ATTORNEYS

United States Patent Office 3,085,462
Patented Apr. 16, 1963

3,085,462
DOUBLE ACTING RELEASE PIN
Paul D. Myers, La Canada, Calif., assignor to Aerpat Aktien Gesellschaft, Glarus, Switzerland, a corporation of Switzerland
Filed Dec. 8, 1958, Ser. No. 778,892
1 Claim. (Cl. 85—5)

This invention relates to releasable fasteners and is particularly directed to double acting pin type fasteners of the general type shown in the Spooner Patent 2,352,414.

Releasable pin type fasteners of this general character employ one or more laterally moving locking balls which are projected through side apertures in a hollow shank by means of a plunger mounted to slide axially within the shank. Such double acting release pins provide for lateral retraction of the locking balls when the plunger moves axially in either direction from a central position.

It is an important object of this invention to provide an improved type of double acting release pin which uses first resilient means to resist axial motion of the plunger in one direction and second resilient means to resist axial movement of the plunger in the other direction. In this manner it is possible to provide for greater resistance to movement of the plunger in one direction than in the other direction and this is highly advantageous in certain installations. Another object of this invention is to provide a double acting release pin assembly in which a floating washer is mounted within a housing and wherein two separate springs each contact the washer on one side, one of the springs engaging the housing and the other spring engaging the plunger. Another object is to provide a device of this type which is particularly adapted for economical manufacture on a quantity production basis. Other and more detailed objects and advantages will appear hereinafter.

Figure 1:
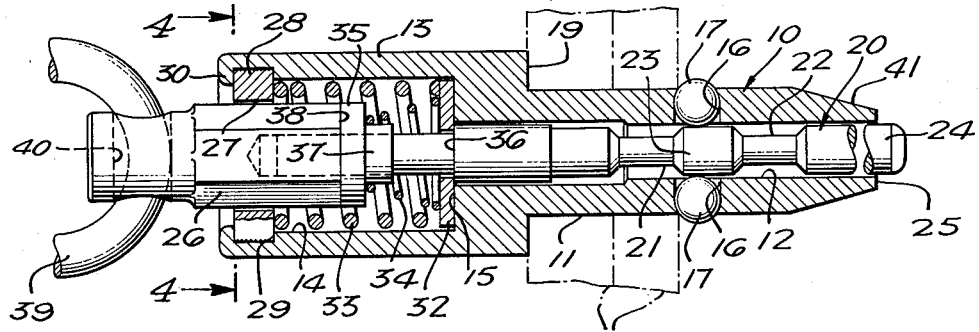
FIGURE 1 is a longitudinal sectional view showing a preferred embodiment of this invention in locking position.

Referring to the drawings, the hollow shank member 10 is provided with a cylindrical outer surface 11 and a central axial bore 12. The shank member 10 is also provided with a housing portion 13 having a counterbore 14 terminating in a shoulder 15. Side apertures 16 extend through the annular wall of the shank member 10 and communicate with the central bore 12. A locking ball 17 is mounted to move laterally in each of the apertures 16. The outer ends of the apertures 16 are reduced in size to prevent the balls from moving completely out of the apertures but permitting a portion of each ball to move beyond the cylindrical surface 11. In the locking position shown in FIGURE 1 the balls are effective to clamp apertured work members 18 against the shoulder 19 on the outer surface of the shank member 10.

The plunger generally designated 20 projects axially through the bore 12 and counterbore 14. The plunger is provided with a pair of encircling grooves 21 and 22 on opposite sides of a central land portion 23. A nose portion 24 of the plunger 20 projects beyond the extreme end 25 of the shank member 10 when the land portion 23 is in locking position as shown in FIGURE 1.

The plunger 20 includes a hexagonal part 26 which projects through a hexagonal opening 27 in the abutment ring 28. This abutment ring is held in place against shoulder 29 on the housing portion 13 by means of a retaining lip 30 which is rolled over the outer edge of the ring 28 after it is assembled into the housing portion 13. The hexagonal part 26 slides axially within the hexagonal opening 27 but relative rotary movement between the plunger 20 and shank 10 is prevented.

A floating washer 32 encircles a portion of the plunger 20 and is mounted for axial movement within the counterbore. A coil spring 33 engages the floating washer 32 at one end and engages the abutment end 28 at the other end and serves to hold the floating washer 32 in contact with the housing shoulder 15.

A conical spring 34 engages the floating washer 32 at one end and engages a flange on the circular collar 35 at the other end. In the particular form of the device shown in the drawings, the spring 34 is weaker than the spring 33. The collar 35 is fixed on the plunger 20 and engages the hexagonal part 26. A shoulder 36 on the plunger 20 is engageable with the floating washer 32.

Figure 2:
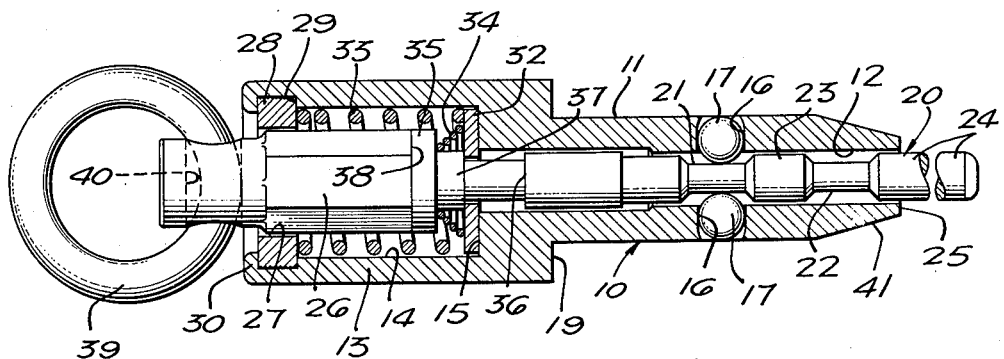
FIGURE 2 is a sectional view similar to FIGURE 1 showing the plunger in projected position.

When the plunger 20 is moved from the locking position shown in FIGURE 1 to the projected position shown in FIGURE 2, the land portion 23 moves away from the locking balls 17 to permit them to move radially inwardly into the groove 21 on the plunger 20. The small conical spring 34 is compressed but the larger cylindrical coil spring 33 is unaffected. Movement of the plunger 20 toward this projected position is arrested by contact of the projection 37 on the collar 35 with the floating washer 32.

Figure 3:
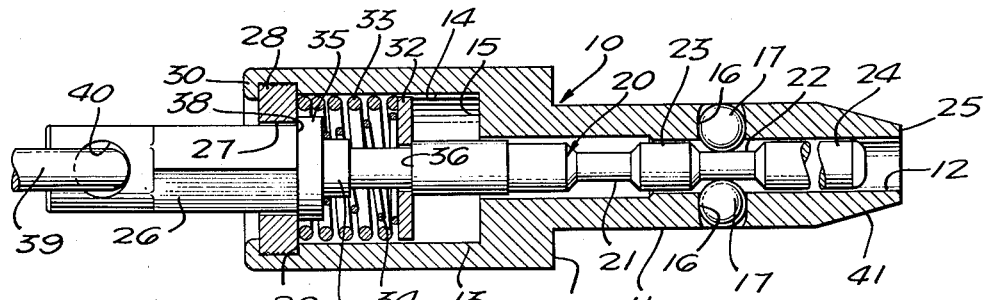
FIGURE 3 is a sectional plan view showing the plunger in retracted position.
Figure 4:
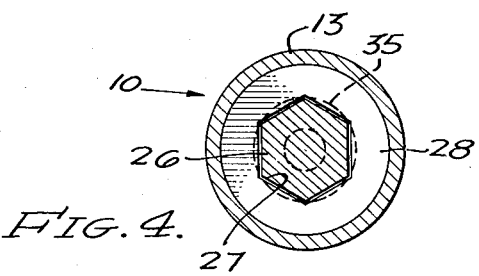
FIGURE 4 is a transverse sectional view taken substantially on the lines 4—4 as shown in FIGURE 1.

When the plunger 20 is moved to retracted position as shown in FIGURE 3, the groove 22 is brought into registry with the position of the locking balls 17, permitting them to move radially inwardly. The shoulder 36 on the plunger engages the floating washer 32 to move it axially in the counterbore 14 in a direction away from the shoulder 15. This action compresses the coil spring 33 but has no effect on the conical spring 34 which simply travels with the plunger 20 and floating collar 32. Motion of the plunger 20 to the left as viewed in FIGURE 3 is arrested by a contact of the collar 35 with the abutment ring 28. As shown in FIGURES 3 and 4, the maximum diameter of the collar 35 is greater than the distance across the flats of the hexagonal part 26, thereby providing shoulder surfaces 38 on the collar which engage the abutment ring 28.

Any convenient form of manually operable member may be provided on the hexagonal part 26. In the particular form of the device shown in the drawings a ring 39 is loosely received in a transverse bore 40 in the projecting portion of the member 26.

In operation, the device may be inserted into aligned apertures in work pieces 18 and the forward end of the hollow shank member 10 may be tapered as shown at 41 to facilitate such axial insertion. Pressure applied to the plunger 20 by means of the ring 39 serves to move the plunger 20 to the projected position shown in FIGURE 2 so that locking balls 17 may be retracted to permit the shank to enter the apertured work pieces 18. The ring 39 may then be released and the conical spring 34 returns the plunger 20 to the locking position shown in FIGURE 1. In this position, the forward portion 24 of the plunger 20 projects out of the shank member 10 and a force may be applied to this projecting portion if necessary to move the plunger 20 to the retracted position shown in FIGURE 3. In the normal use of the device, however, the movement of the plunger 20 to the retracted position is accomplished by manually applying a tension force to the ring 39. This force is also effective to retract the shank out of the apertured work members 18.

Having fully described my invention, it is to be understood that I do not wish to be limited to the details herein set forth but my invention is of the full scope of the appended claim.

I claim:

In a double acting release pin assembly, the combination of: a tubular shank member having a central bore and having side apertures communicating with the bore, a ball mounted in each aperture adapted to move radially outward to project beyond the outer surface of the tubular shank member, a plunger mounted for movement axially within said central bore and having a pair of axially spaced grooves of a length and depth to accommodate said ball when retracted within the outer surface of the shank member, the plunger having a portion positioned between said grooves adapted to contact the balls to move them outwardly to project beyond the surface of said shank, the tubular shank member having a housing portion provided with a counterbore, the housing portion having an abutment at one end of the counterbore and a shoulder at the other end, a floating washer mounted for axial movement within the counterbore and adapted to engage the said shoulder, a cylindrical coil spring encircling the plunger and interposed between the abutment and the washer, the plunger extending through said counterbore and having a portion engageable with the washer on the side thereof opposite said spring whereby movement of the plunger in one direction relative to the shank member acts to compress said coil spring, and a conical spring interposed between said washer and a second portion of said plunger on the opposite side of said washer from said first portion, whereby axial movement of the plunger in the other direction relative to the shank member serves to compress the conical spring whereby movement of said plunger in either axial direction compresses only one of said springs and not the other, said conical spring being more easily flexed than said coil spring for easier movement of said plunger in said other direction.

References Cited in the file of this patent

UNITED STATES PATENTS

| | | |
|---|---|---|
| 1,566,023 | Kuehner | Dec. 15, 1925 |
| 1,638,213 | Reschke | Aug. 9, 1927 |
| 2,352,414 | Spooner | June 27, 1944 |
| 2,373,125 | Loepsinger | Apr. 10, 1945 |
| 2,679,234 | Robinson | May 25, 1954 |
| 2,724,386 | Schade | Nov. 22, 1955 |
| 2,960,741 | Bruno | Nov. 22, 1960 |
| 2,984,884 | Chapman et al. | May 23, 1961 |